United States Patent
O'Brien

(10) Patent No.: US 9,550,392 B2
(45) Date of Patent: Jan. 24, 2017

(54) METHOD FOR CLEANING PAINT FROM A PAINT APPLICATOR

(71) Applicant: Donald O'Brien, Petaluma, CA (US)

(72) Inventor: Donald O'Brien, Petaluma, CA (US)

( * ) Notice: Subject to any disclaimer, the term of this patent is extended or adjusted under 35 U.S.C. 154(b) by 274 days.

(21) Appl. No.: 14/509,851

(22) Filed: Oct. 8, 2014

(65) Prior Publication Data

US 2016/0101444 A1    Apr. 14, 2016

(51) Int. Cl.
| | | |
|---|---|---|
| *B08B 7/00* | (2006.01) | |
| *B44D 3/00* | (2006.01) | |
| *A46B 17/06* | (2006.01) | |
| *C09D 9/00* | (2006.01) | |
| *C09D 9/04* | (2006.01) | |

(52) U.S. Cl.
CPC ............. *B44D 3/006* (2013.01); *A46B 17/06* (2013.01); *A46B 2200/202* (2013.01); *C09D 9/005* (2013.01); *C09D 9/04* (2013.01)

(58) Field of Classification Search
CPC .......... B08B 3/04; B08B 3/044; C09D 9/005; C09D 9/02; C09D 9/04
USPC ........................................... 134/38
See application file for complete search history.

(56) References Cited

U.S. PATENT DOCUMENTS

| | | | |
|---|---|---|---|
| 7,740,710 B2 * | 6/2010 | Notari | C07D 317/36 106/31.6 |
| 9,394,550 B2 * | 7/2016 | Dummer | C11D 3/2093 |
| 2009/0038650 A1 * | 2/2009 | Grogan | B44D 3/006 134/38 |

OTHER PUBLICATIONS

"Biodiesel Use, Handling, and Fuel Quality", Pressmand and Morris, NCAT Energy Specialists, Sep. 2007.*

* cited by examiner

*Primary Examiner* — Nina Bhat

(57) ABSTRACT

A method of cleaning a coating apparatus that has been coated with a coating such as an oil-based paint using bio-diesel.

5 Claims, No Drawings

METHOD FOR CLEANING PAINT FROM A PAINT APPLICATOR

FIELD OF THE INVENTION

This invention relates to the paint industry and more particularly to use of bio-diesel to clean paint from a paint applicator such as a paint brush, roller or spray equipment and a method for same.

BACKGROUND OF THE INVENTION

The cleaning of paint applicators, such as paint brushes, rollers or spray equipment that has been used to apply water and solvent-based coatings including lacquer, shellac, oil and epoxy, stain or varnish, has historically been accomplished by using mineral spirits or paint thinner. A sufficient amount of the solvent must be poured into a container to fully cover the paint applicator being cleaned. Using a paint brush as an example, the brush is dipped and swirled in the solvent so as to work the solvent into the bristles. When the solvent is clouded with paint, it is poured into a waste container and the process is repeated with clean solvent until the bristles are clean. The brush is then spun or flicked, either by hand or by a mechanical spinner to remove the solvent.

Unfortunately, the solvents constitute health hazards. For example, plant based turpentine (fluid obtained from the distillation of resin obtained from live trees, mainly pines) is an organic solvent whose vapour can irritate the skin and eyes, damage the lungs and respiratory system, as well as the central nervous system of a user when inhaled. It is also combustible, thereby constituting a fire hazard. While there has been a move towards inexpensive petroleum-based replacements (mineral spirits or mineral turpentine, etc.) for the plant-based turpentine, these petroleum-based products; such as petro chemical solvents, paint thinner, lacquer thinner, acetone and plant-based alcohol are also toxic. Acute exposure can lead to central nervous system depression and exposure to high concentrations in an enclosed space can cause drowsiness, dizziness, nausea and can eventually lead to unconsciousness. Skin exposed to repeated or prolonged contact can result in contact dermatitis or even chemical burns. In addition, as the solvents are harmful to the environment, special care must be taken to dispose of them. Used solvents must be taken to special facilities for their disposal.

Accordingly, there is a need for an improved method of cleaning paint applicators coated with oil-based paints.

SUMMARY OF THE INVENTION

The present invention comprises a method of using B100 bio-diesel to clean a coating from a coating applicator. The type of coating includes, but is not limited to oil-based, water/oil "hybrids", dried latex, lacquer, shellac, urethane, epoxy coatings.

In a preferred embodiment, the invention comprises a method of cleaning a coating from surfaces of a coating applicator comprising the following steps:
  a. immerse the coating applicator in B100 bio-diesel in a container;
  b. agitate the coating applicator in said B100 bio-diesel until the coating has absorbed and combined with the B100 bio-diesel forming a coating solution and is no longer affixed to the surfaces of the coating applicator.
  c. remove the coating applicator from the B100 bio-diesel;
  d. immerse the coating applicator in an emulsifying solution;
  e. agitate the coating applicator in the emulsifying solution until the coating solution is removed from the surfaces of the coating applicator, the coating solution combining with the emulsifying solution to form a coating emulsifying solution;
  f. remove the coating applicator from the emulsifying solution;
  g. immerse the coating applicator in a container of water;
  h. agitate the coating applicator in the water until the coating emulsifying solution is absorbed in the clean water and no longer adheres to the surfaces of the coating applicator.

In another aspect, the method further comprises the step of abrading the coating applicator using an abrading tool between steps a and b. In yet another aspect, after abrading, the coating applicator can be allowed to soak in the B100 bio-diesel for 48 hours prior to commencing step b.

The foregoing was intended as a broad summary only and of only some of the aspects of the invention. It was not intended to define the limits or requirements of the invention.

Other aspects of the invention will be appreciated by reference to the detailed description of the preferred embodiment and alternative embodiments and to the claims.

DETAILED DESCRIPTION OF THE INVENTION

The present invention is for the use of bio-diesel for cleaning, including but not limited to, oil-based, water/oil "hybrids", dried latex, lacquer, shellac, urethane, and epoxy coatings from the applicator on which they are present.

Biodiesel is a vegetable oil or animal fat based diesel fuel comprising long-chain alkyl esters. It is typically made by chemically reacting lipids such as vegetable oil or animal fat with methanol to produce fatty acid esters.

In its pure form (ie. 100% biodiesel) it is referred to as B100. It can also be blended with conventional hydrocarbon based diesel with the resulting blend name reflecting the percentage of bio-diesel; for example, B20 would be 20% bio-diesel and 80% petrodiesel. These various bio-diesel products can be used in most diesel engines and can also be used as a heating fuel in domestic and commercial boilers.

The inventor has discovered that B100 is also useful in the cleaning and restoring of a coating applicator such as a paint brush, roller, etc., coated with either a solvent or waterborne paint product such as alkyd (oil & water based), oil-based, acrylic, shellac, lacquer and hybrids (henceforth collectively described as the "coating"). Use of B100 has the added advantage that it is non-toxic, biodegradable, reusable and sustainable. It is a gentle product that will not harm the handle or ferrule of the applicator. It works on paint brushes whether they are still wet or have dried. The methods for cleaning various products depending on their condition are detailed below.

A. For a coating applicator/apparatus on which the coating is still fluid or semi-fluid.
  1. Immerse the coating applicator in B100 bio-diesel (in a container accessible from the top like a pail or bucket). While soaking the coating applicator in the B100 bio-diesel, agitate, oscillate or wag the coating applicator until the coating has absorbed and combined with the B100 bio-diesel to form a coating/bio-diesel solution and is no longer affixed to the surfaces of the coating applicator. The user can use a combination of visual inspection, smell and touch to determine when the coating has combined with the B100 bio-diesel. For example, with a brush, the user can spread the bristles apart to ensure that the interior bristles and heel of the brush no longer have coating affixed to them.
2. Remove the coating applicator from the B100 bio-diesel, allowing excess liquid to drain into the B100 container if the user wishes.
3. Immerse the coating applicator in a strong emulsifying solution such as laundry detergent, dish washing liquid or other like cleaning product such as those manufactured under the brand name SIMPLE GREEN. For example the inventor has found that a bucket that has been filled with a combination of water and laundry detergent such as that sold under the brand name TIDE™ works well as an emulsifying solution.
4. Agitate, oscillate or wag the coating applicator in the emulsifying solution until the coating/B100 bio-diesel combination solution is removed from the surfaces of the coating applicator. This is once again determined by a user using sight, smell and/or touch. At this step, the coating/B100 bio-diesel solution combines with the emulsifying solution to form a coating bio-diesel emulsifying solution.
5. Remove the coating applicator from the emulsifying solution. If the user wishes, they can allow excess coating bio-diesel emulsifying solution to drain into the emulsifying bucket.
6. Immerse the coating applicator in a container of water and agitate, oscillate or wag the coating applicator in the water until the coating bio-diesel emulsifying solution is absorbed in the clean water and no longer adheres to the surfaces of the coating applicator.

After the cleaning process has been completed, the brush or other coating applicator is allowed to dry. Any additional conditioning steps can be taken, such as brushing the bristles, etc.

B. For a coating applicator/apparatus on which coatings have dried within 48 hours
1. Immerse the coating applicator in a container of B100 bio-diesel.
2. While soaking the coating applicator in the B100 bio-diesel, abrade the applicator with an abrasive tool, such as a wire brush, to break the surface of the dried coating on the coating applicator.
3. Continue to soak the coating applicator in B100 bio-diesel for an extended period of time to allow the B100 bio-diesel to absorb and combine with the dried coating. The actual time required will depend on a variety of factors such as the type of coating, the length of time it has been drying, the temperature, etc. Typically with coatings that have been drying for up to 48 hours, a 24 hour soak in the B100 bio-diesel is sufficient, however the actual time could be less or more, and the user can review the condition of the coating applicator at various times to determine if sufficient time has passed so that the coating is no longer affixed to the coating applicator.
4. Agitate, oscillate or wag the coating applicator in the B100 bio-diesel to ensure that all of the coating on the surfaces of the coating applicator (including the interior bristles of a paint brush) has absorbed and combined with the B100 bio-diesel.
5. Remove the coating applicator from the B100 bio-diesel, allowing excess to drain into the B100 container if the user wishes.
6. Immerse the coating applicator in a strong emulsifying solution. Agitate, oscillate or wag the coating applicator in the strong emulsifying solution until the coating/B100 bio-diesel combination is removed from the surfaces of the coating applicator forming a further solution.
7. Remove the coating applicator from the emulsifying solution allowing excess to drain into the emulsifying bucket if the user so chooses.
8. Immerse the coating applicator in a container of clean water. Agitate, oscillate or wag the coating applicator in water until the emulsifying solution is absorbed in the water and no longer adheres to the surfaces of the coating applicator/apparatus.

C. For a coating applicator/apparatus on which coatings have dried more than 48 hours.
1. Immerse the coating applicator in a container of B100 bio-diesel.
2. While soaking the coating applicator in B100 bio-diesel, abrade the applicator with an abrasive tool to break the surface of the dried coating.
3. Soak the coating applicator/apparatus in B100 bio-diesel for 48 hours or until coating has absorbed and combined with the B100 bio-diesel and is no longer affixed to the surfaces of the coating applicator/apparatus. As above, the actual time required for soaking will depend on the condition of the brush (how hard is the coating affixed to it—time curing, temperature, etc.).
4. Soak, agitate, oscillate or wag the coating applicator in B100 bio-diesel to ensure that all of the coating on the surfaces of the coating applicator (including the interior bristles of a paint brush) has absorbed and combined with the B100 bio-diesel. This step is required because the coating (paint, etc) bio-diesel solution will not float away from the bristles without agitation.
5. Remove the coating applicator from the B100 bio-diesel, allowing excess to drain into the B100 container if the user wishes.
6. Immerse the coating applicator in a strong emulsifying solution. Agitate, oscillate and wag the coating applicator in the strong emulsifying solution until the coating/B100 bio-diesel combination is removed from the surfaces of the coating applicator.
7. Remove the coating applicator from the emulsifying solution allowing excess to drain into the emulsifying bucket if desired.
8. Immerse the coating applicator in a container of clean water. Agitate, oscillate and wag the coating applicator/apparatus in clean water or the like until the emulsifying solution is absorbed in the clean water or the like and no longer adheres to the surfaces of the coating applicator/apparatus.

D. For a coating applicator/apparatus having interior parts, tubes, hoses, cavities or tanks.
1. Immerse the interior of applicator in a container of B100 bio-diesel until the coating has absorbed and combined with the B100 bio-diesel and is no longer affixed to the interior surfaces of the coating applicator. Agitate as necessary.
2. Immerse the coating applicator in a strong emulsifier. Rinse the coating applicator with the strong emulsifying solution until the coating/B100 bio-diesel combination is removed from the interior surfaces of the coating applicator.
3. Rinse the interior of the coating applicator in clean water until the emulsifying solution is absorbed in the clean water and no longer adheres to the interior surfaces of the coating applicator.

Preferably, the above methods are utilized for cleaning brushes and air cleaners. While they could also be used on other coating applicators, such as rollers and sponges, given their low cost and the time to clean, these will typically be disposed of after use.

The emulsifying solution and water can be allowed to evaporate and the remaining paint residue properly disposed of. The B100 bio-diesel can continue to be reused while in liquid format. The paint (coating) solids settle to the bottom of the container allowing the B100 bio-diesel to be poured off and reused. By mixing a little more B100 with the resulting fluid, one can reuse it. The paint solids at the bottom can be scraped off into a container and disposed of as toxic waste.

It is also contemplated that the B100 bio-diesel may be modified, for example by adding food colouring or the like, without detracting from its cleaning effectiveness.

What is claimed is:

1. A method of cleaning a coating from surfaces of a coating applicator comprising the following steps:
   a. immersing said coating applicator in B100 bio-diesel in a container;
   b. agitating said coating applicator in said B100 bio-diesel until said coating has absorbed and combined with the B100 bio-diesel forming a coating solution and is no longer affixed to the surfaces of the coating applicator;
   c. removing said coating applicator from said B100 bio-diesel;
   d. immersing the coating applicator in an emulsifying solution;
   e. agitating said coating applicator in the emulsifying solution until said coating solution is removed from said surfaces of said coating applicator, said coating solution combining with said emulsifying solution to form a coating emulsifying solution;
   f. removing said coating applicator from said emulsifying solution;
   g. immersing said coating applicator in a container of water; and
   h. agitating said coating applicator in said water until said coating emulsifying solution is absorbed in the clean water and no longer adheres to said surfaces of said coating applicator.

2. The method of claim 1 further comprising the step of abrading said coating applicator using an abrading tool between steps a and b.

3. The method of claim 2 further comprising soaking said coating applicator in said B100 bio-diesel up to 48 hours prior to commencing step b.

4. The method of claim 1 wherein said B100 bio-diesel further includes food colouring.

5. The method of claim 1 wherein said coating is selected from the group consisting of oil-based paints, water and oil-based paints, dried latex, lacquer, shellac, urethane and epoxy based coatings.

* * * * *